United States Patent
Nolan

(10) Patent No.: US 12,214,560 B2
(45) Date of Patent: Feb. 4, 2025

(54) INDEPENDENTLY DEPOSITING AND IN SITU CONSOLIDATING THERMOPLASTIC MATERIAL

(71) Applicant: Rohr, Inc., Chula Vista, CA (US)

(72) Inventor: Patrick Nolan, Laguna Hills, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/856,596

(22) Filed: Jul. 1, 2022

(65) Prior Publication Data

US 2024/0001629 A1    Jan. 4, 2024

(51) Int. Cl.
  *B29C 70/38*    (2006.01)
(52) U.S. Cl.
  CPC .................................. *B29C 70/382* (2013.01)
(58) Field of Classification Search
  CPC ..... B29C 70/38; B29C 70/382; B29C 70/384; B29C 70/386; B29C 70/388
  See application file for complete search history.

(56) References Cited

U.S. PATENT DOCUMENTS

| | | | |
|---|---|---|---|
| 5,447,586 A | 9/1995 | Tam | |
| 10,828,847 B2 | 11/2020 | Matsen | |
| 10,974,466 B2 | 4/2021 | Moore | |
| 2006/0260751 A1* | 11/2006 | Lauder | B29C 70/545 |
| | | | 156/382 |
| 2008/0023130 A1* | 1/2008 | Gomez | B32B 37/0046 |
| | | | 156/361 |
| 2019/0389148 A1* | 12/2019 | Wadsworth | B29C 66/81451 |
| 2020/0247035 A1 | 8/2020 | Hauber | |
| 2020/0384699 A1 | 12/2020 | Canas Rios | |
| 2021/0229375 A1 | 7/2021 | Gaillard | |
| 2021/0276688 A1 | 9/2021 | Sjostedt | |
| 2022/0063204 A1 | 3/2022 | Nixon | |
| 2023/0009761 A1* | 1/2023 | Bryant | B29C 70/545 |

OTHER PUBLICATIONS

EP search report for EP23182694.2 dated Nov. 27, 2023.

* cited by examiner

*Primary Examiner* — George R Koch
(74) *Attorney, Agent, or Firm* — Getz Balich LLC

(57) ABSTRACT

A method is provided for forming a thermoplastic structure. During this formation method, a first layer of thermoplastic material is deposited on a first thermoplastic object using a material deposition device. The first layer of thermoplastic material is tacked to the first thermoplastic object during the depositing of the first layer of thermoplastic material. The first layer of thermoplastic material is consolidated with the first thermoplastic object using a material consolidation device to provide a second thermoplastic object. A second layer of thermoplastic material is deposited on the second thermoplastic object using the material deposition device. The second layer of thermoplastic material is tacked to the second thermoplastic object during the depositing of the second layer of thermoplastic material. The second layer of thermoplastic material is consolidated with the second thermoplastic object using the material consolidation device to provide a third thermoplastic object.

13 Claims, 6 Drawing Sheets

INDEPENDENTLY DEPOSITING AND IN SITU CONSOLIDATING THERMOPLASTIC MATERIAL

BACKGROUND

1. Technical Field

This disclosure relates generally to forming a thermoplastic structure and, more particularly, to depositing and consolidating thermoplastic material in situ.

2. Background Information

Various methods and systems are known in the art for depositing and consolidating thermoplastic material to form a thermoplastic structure. While these known formation methods and systems have various advantages, there is still room in the art form improvement. There is a need in the art, in particular, for improving both deposition parameters and consolidation parameters.

SUMMARY OF THE DISCLOSURE

According to an aspect of the present disclosure, a method is provided for forming a thermoplastic structure. During this formation method, a first layer of thermoplastic material is deposited on a first thermoplastic object using a material deposition device. The first layer of thermoplastic material is tacked to the first thermoplastic object during the depositing of the first layer of thermoplastic material. The first layer of thermoplastic material is consolidated with the first thermoplastic object using a material consolidation device to provide a second thermoplastic object. A second layer of thermoplastic material is deposited on the second thermoplastic object using the material deposition device. The second layer of thermoplastic material is tacked to the second thermoplastic object during the depositing of the second layer of thermoplastic material. The second layer of thermoplastic material is consolidated with the second thermoplastic object using the material consolidation device to provide a third thermoplastic object.

According to another aspect of the present disclosure, another method is provided for forming a thermoplastic structure. During this formation method, a first layer of thermoplastic material is deposited on a first thermoplastic object within a formation space using a material deposition device press. The first layer of thermoplastic material is tacked to the first thermoplastic object during the depositing of the first layer of thermoplastic material. The first layer of thermoplastic material is consolidated with the first thermoplastic object within the formation space using a material consolidation device press.

According to still another aspect of the present disclosure, a system is provided for forming a thermoplastic structure. This formation system includes a formation space, a material deposition device, a first manipulator, a material consolidation device and a second manipulator. The material deposition device is configured to deposit a first layer of thermoplastic material on a first thermoplastic object within the formation space. The material deposition device is also configured to tack the first layer of thermoplastic material to the first thermoplastic object during the depositing of the first layer of thermoplastic material. The first manipulator is configured to move a head of the material deposition device within the formation space during the depositing of the first layer of thermoplastic material. The material consolidation device is configured to consolidate the first layer of thermoplastic material with the first thermoplastic object within the formation space to provide a second thermoplastic object. The second manipulator is configured to move a head of the material consolidation device within the formation space during the consolidation of the first layer of thermoplastic material.

The head of the material consolidation device may include a roller configured to press the first layer of thermoplastic material against the first thermoplastic object during the consolidation of the first layer of thermoplastic material.

The head of the material consolidation device may include a shoe configured to press the first layer of thermoplastic material against the first thermoplastic object during the consolidation of the first layer of thermoplastic material.

The material deposition device press may be configured as or otherwise include a roller. The material consolidation device press may also or alternatively be configured as or otherwise include a roller.

The depositing of the first layer of thermoplastic material, the consolidating of the first layer of thermoplastic material, the depositing of the second layer of thermoplastic material and the consolidating of the second layer of thermoplastic material may be performed within a common formation space.

The material deposition device may be configured as or otherwise include an automated fiber placement device.

The first layer of thermoplastic material and the second layer of thermoplastic material may each be configured from or otherwise include fiber reinforcement within a thermoplastic matrix.

The consolidating of the first layer of thermoplastic material may include: heating the first layer of thermoplastic material and the first thermoplastic object; and pressing the heated first layer of thermoplastic material against the heated first thermoplastic object.

The material consolidation device may include a consolidation device press. The heated first layer of thermoplastic material may be pressed against the heated first thermoplastic object using the consolidation device press. The material deposition device may include a deposition device press. The depositing of the first layer of thermoplastic material may include: heating at least the first layer of thermoplastic material; and pressing the heated first layer of thermoplastic material against the first thermoplastic object using the deposition device press.

The consolidation device press may be configured as or otherwise include a consolidation device roller. The deposition device press may also or alternatively be configured as or otherwise include a deposition device roller.

The material consolidation device may include a roller. The first layer of thermoplastic material may be consolidated with the first thermoplastic object using the roller.

The material consolidation device may include a shoe. The first layer of thermoplastic material may be consolidated with the first thermoplastic object using the shoe.

The formation method may also include: moving a head of the material deposition device using a first manipulator; and moving a head of the material consolidation device using a second manipulator.

The formation method may also include: moving a head of the material deposition device along a first path during the depositing of the first layer of thermoplastic material; and moving a head of the material consolidation device along a second path during the consolidating of the first layer of thermoplastic material. The second path may be different than or the same as the first path.

The formation method may also include: moving a head of the material deposition device at a first speed during the depositing of the first layer of thermoplastic material; and moving a head of the material consolidation device at a second speed during the consolidating of the first layer of thermoplastic material. The second speed may be different than (or the same as) the first speed.

The formation method may also include: heating the first layer of thermoplastic material to a first temperature during the depositing of the first layer of thermoplastic material; and heating the first layer of thermoplastic material to a second temperature during the consolidating of the first layer of thermoplastic material that may be different than (or the same as) the first temperature.

The formation method may also include: pressing the first layer of thermoplastic material against the first thermoplastic object at a first pressure during the depositing of the first layer of thermoplastic material; and pressing the first layer of thermoplastic material against the first thermoplastic object at a second pressure during the consolidating of the first layer of thermoplastic material that may be different than (or the same as) the first pressure.

The formation method may also include: depositing a third layer of thermoplastic material on the third thermoplastic object using the material deposition device, where the third layer of thermoplastic material may be tacked to the third thermoplastic object during the depositing of the third layer of thermoplastic material; and consolidating the third layer of thermoplastic material with the third thermoplastic object using the material consolidation device to provide a fourth thermoplastic object.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
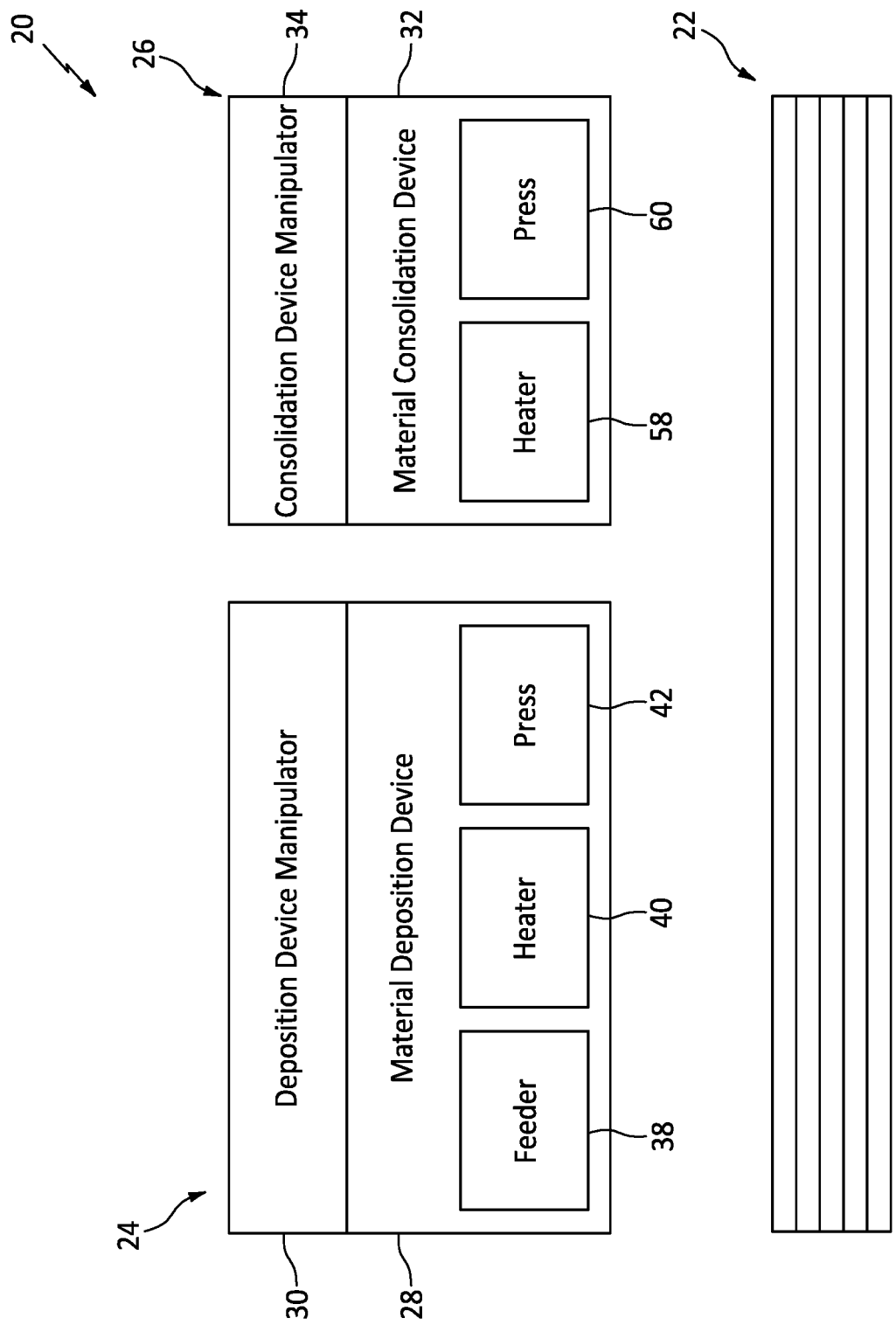
FIG. 1 is a schematic illustration of a system for forming a thermoplastic structure.

FIG. 1 is a schematic illustration of a system 20 for forming a thermoplastic structure 22. The thermoplastic structure 22 may be configured as or may be part of a structure of an airframe for an aircraft. The thermoplastic structure 22 may alternatively be configured as or may be part of a structure of a propulsion system for the aircraft. The present disclosure, however, is not limited to the foregoing exemplary thermoplastic structure configurations nor to aircraft applications.

The formation system 20 includes a material deposition system 24 and a material consolidation system 26. The material deposition system 24 of FIG. 1 includes a material deposition device 28 and a deposition device manipulator 30. The material consolidation system 26 of FIG. 1 includes a material consolidation device 32 and a consolidation device manipulator 34.

Figure 2A:
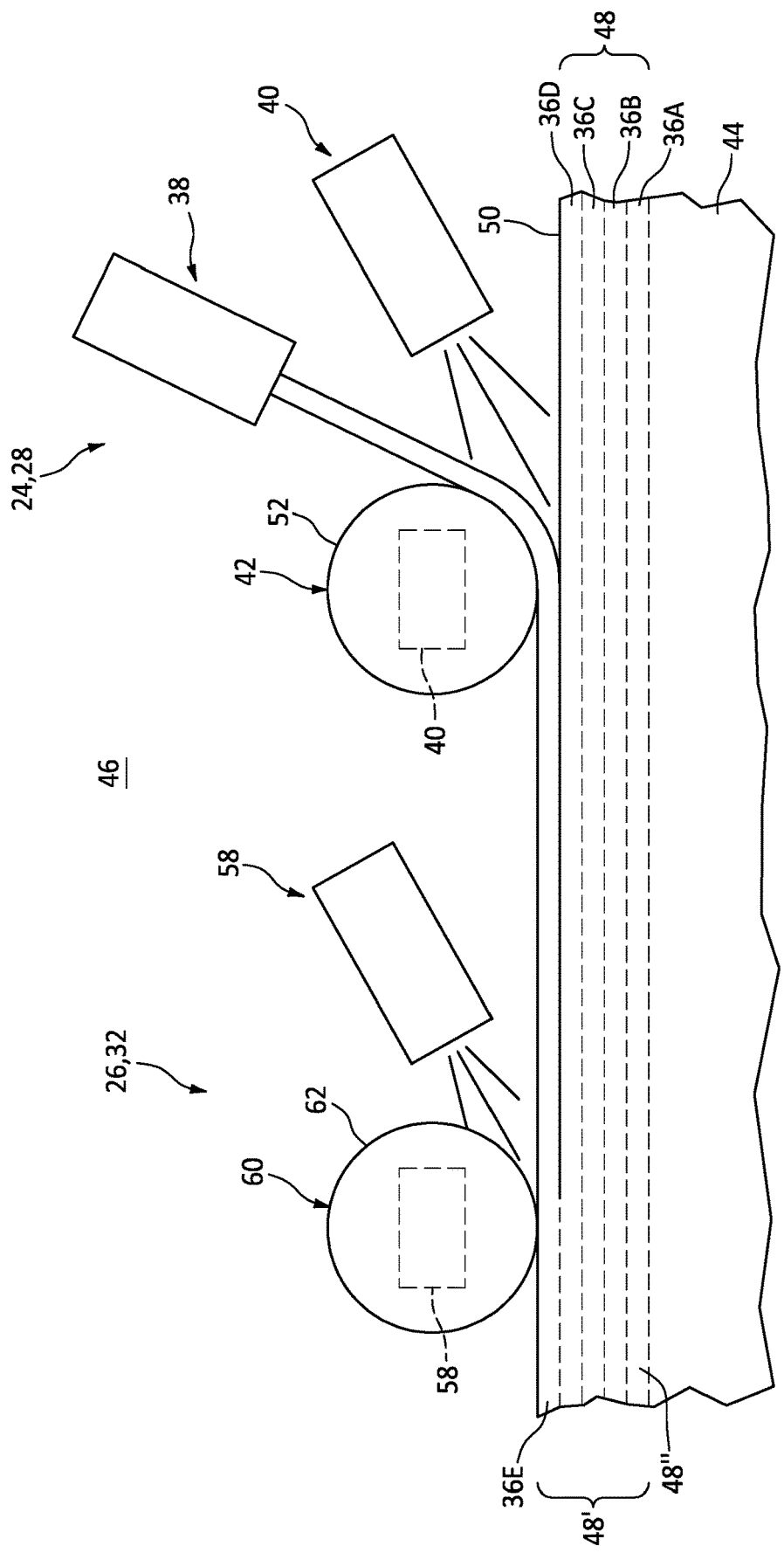
FIG. 2A is a schematic illustration of a material deposition device and a material consolidation device forming the thermoplastic structure, where the devices include press rollers.
Figure 2B:
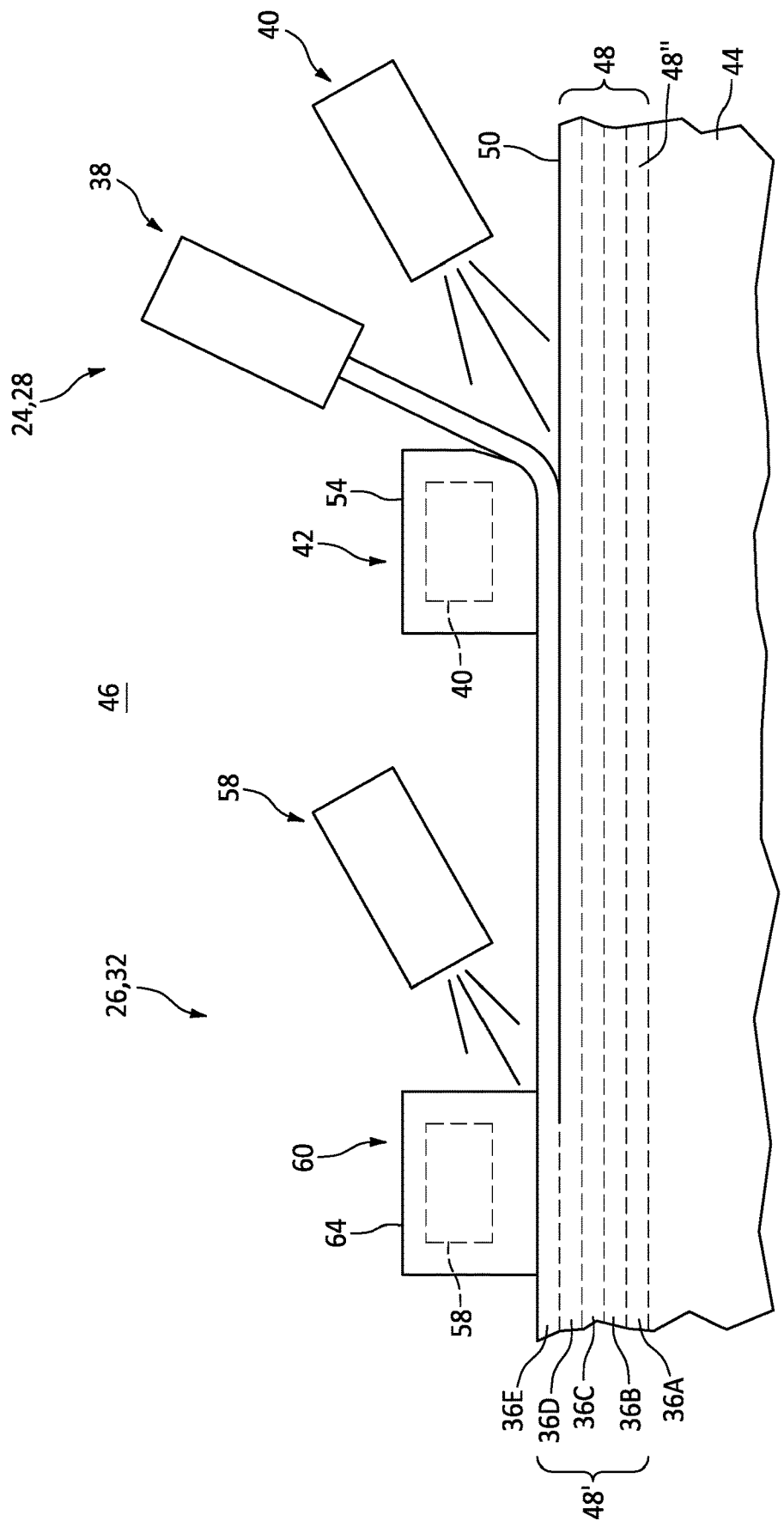
FIG. 2B is a schematic illustration of the material deposition device and the material consolidation device forming the thermoplastic structure, where the devices include press shoes.

Referring to FIGS. 2A and 2B, the material deposition device 28 is configured to deposit (e.g., place, dispense, apply, lay, etc.) a layer of thermoplastic material 36A-E (generally referred to as "36") on a base. The material deposition device 28, for example, may be configured as an automated fiber placement (AFP) device. The material deposition device 28 of FIGS. 2A and 2B includes a deposition device material feeder 38, a deposition device heater 40 and a deposition device press 42.

The base may be a support 44 (e.g., a platform, a mold, a form, etc.) within a formation space 46 (e.g., an internal, enclosed build space/formation chamber) of the formation system 20, where the layer of thermoplastic material 36 being deposited is a first layer of thermoplastic material (e.g., 36A) deposited to form the thermoplastic structure 22. Alternatively, the base may be a thermoplastic object 48 (e.g., a partially formed thermoplastic structure), where the layer of thermoplastic material 36 being deposited is not the first layer of thermoplastic material (e.g., 36A) deposited to form the thermoplastic structure 22; e.g., a second, third, fourth, etc. layer of the thermoplastic material (e.g., 36B, 36C, 36D, etc.) being deposited by the material deposition device 28. The base of FIGS. 2A and 2B, for example, is formed by one or more previously deposited layers of thermoplastic material (e.g., 36A-D) which have been consolidated together to form the thermoplastic object 48.

The deposition device material feeder 38 is configured to feed, direct and/or otherwise provide the layer of thermoplastic material 36 for the deposition on the base. This thermoplastic material may include fiber reinforcement within a thermoplastic matrix, where the fiber reinforcement may include one or more fibers; e.g., long strand fibers, continuous fibers, etc. Examples of the fiber reinforcement may include, but are not limited to, fiberglass fibers, carbon fibers and aramid (e.g., Kevlar®) fibers. Examples of the thermoplastic matrix may include, but are not limited to, polyether ether ketone (PEEK), polyether ketone ketone (PEKK) and polyphenylene sulfide (PPS). Various types and configurations of material feeders are known in the art, and the present disclosure is not limited to any particular ones thereof.

The deposition device heater 40 is configured to heat a portion of the layer of thermoplastic material (e.g., 36E), which is about to be deposited and/or was just deposited, to an elevated deposition temperature. The deposition device heater 40 may also be configured to heat a portion of the base (e.g., the thermoplastic object 48), onto which the layer of thermoplastic material (e.g., 36E) is about to be disposed and/or was just disposed, to the deposition temperature. This deposition temperature may be selected based on the specific thermoplastic matrix included in the thermoplastic material. The deposition temperature, for example, may be selected such that the thermoplastic matrix within the thermoplastic material softens and becomes tacky. However, the deposition temperature is typically below a melting temperature of the thermoplastic matrix within the thermoplastic material. The deposition temperature may also below a crystallization temperature of the thermoplastic matrix within the thermoplastic material; e.g., a temperature at which molecules of the thermoplastic matrix in the layer (e.g., 36E) being deposited and/or the thermoplastic matrix in the base (e.g., the thermoplastic object 48) are mobile enough to rearrange into an ordered arrangement. Examples of the deposition device heater 40 may include, but are not limited to, a laser heater, an electron beam heater, an electrical resistance (e.g., radiant) heater and a plasma or torch heater.

The deposition device press 42 is configured to press the (e.g., heated) layer of thermoplastic material (e.g., 36E) being deposited with the (e.g., heated) base; e.g., the thermoplastic object 48. The deposition device press 42 may press the layer of thermoplastic material 36 against the base at a deposition pressure. This deposition pressure may be selected such that the layer of thermoplastic material 36 contacts the base. The deposition pressure may also be selected to facilitate tacking (e.g., tack welding) the (e.g., heated) layer of thermoplastic material (e.g., 36E) to the (e.g., heated) thermoplastic object (e.g., 48) during the deposition of the layer of thermoplastic material (e.g., 36E). The deposition device press 42 is configured to follow a contour of an exterior surface (e.g., 50) of the base (e.g., the thermoplastic object 48), which contour may be flat, curve and/or otherwise non-flat. The deposition device press 42, for example, may include a deposition device roller 52 (e.g., see FIG. 2A) and/or a deposition device shoe 54 (e.g., see FIG. 2B). The roller 52/the shoe 54 may each be configured to press the layer of thermoplastic material 36 against the base exterior surface (e.g., 50), without leaving (or with leaving minimal) gaps between the tacked layer of thermoplastic material 36 and the base for example.

In some embodiments, the deposition device heater 40 may be discrete from the deposition device press 42. In other embodiments, the deposition device heater 40 may be arranged with (e.g., located within and/or otherwise thermally coupled with) the deposition device press 42; e.g., see dashed lines in FIGS. 2A and 2B. The deposition device press 42 may thereby provide a buffer between heat generated by the deposition device heater 40 and the thermoplastic material.

Figure 3:
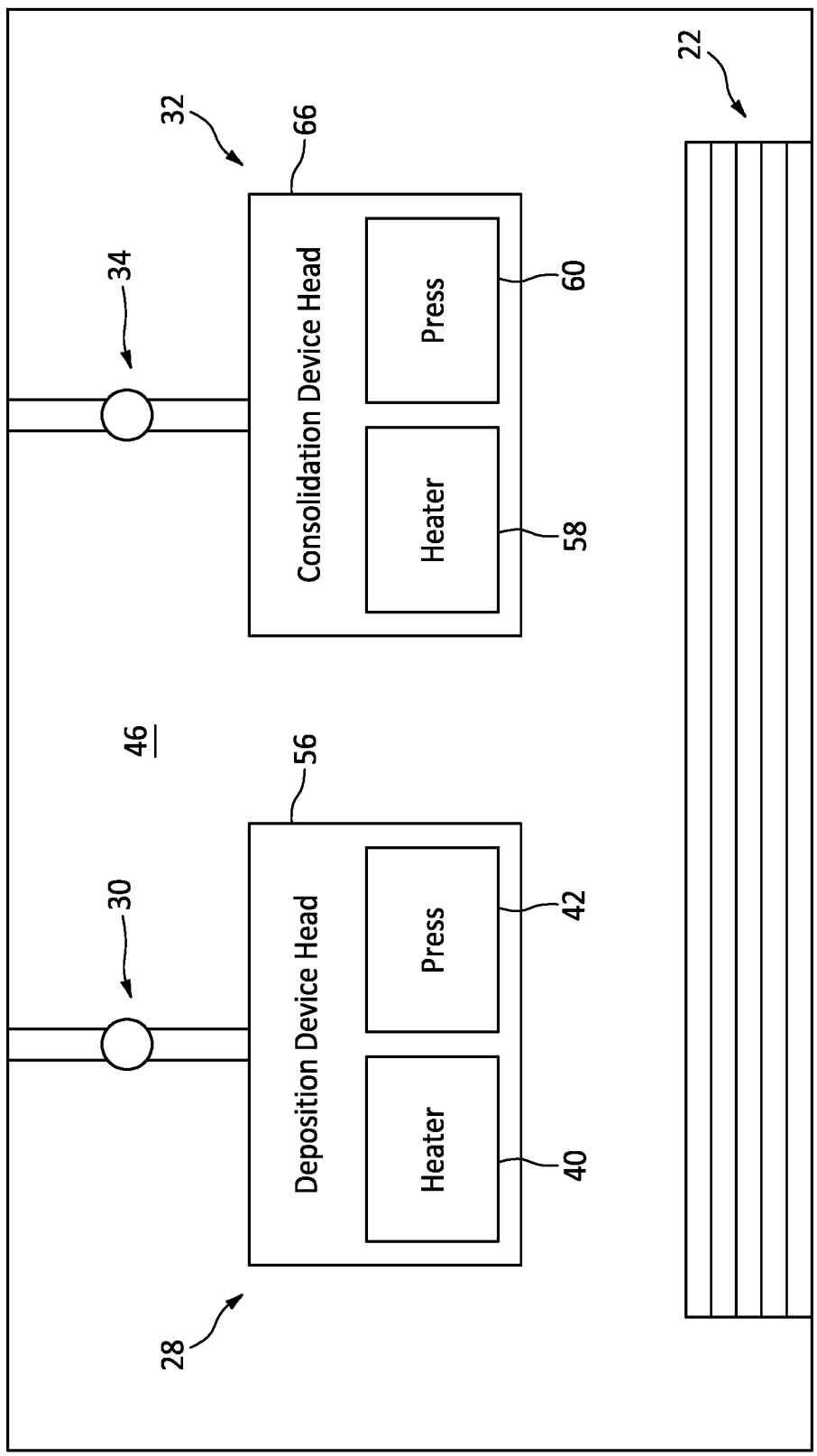
FIG. 3 is a schematic illustration of certain components of the formation system forming the thermoplastic structure.

Referring to FIG. 3, the deposition device manipulator 30 is configured to move (e.g., relocate) at least a head 56 of the material deposition device 28 within the formation space 46. More particularly, the deposition device manipulator 30 is configured to move the deposition device head 56 along the base (e.g., the thermoplastic object 48) to facilitate the deposition of the layer of thermoplastic material 36 with the base. Briefly, the deposition device head 56 may include any one or more components of the material deposition device 28 such as, but not limited to, the deposition device heater 40 and the deposition device press 42. An example of the deposition device manipulator 30 is a single-axis or multi-axis robot. Another example of the deposition device manipulator 30 is a carriage translatable along a track. The present disclosure, however, is not limited to the foregoing exemplary deposition device manipulators. Furthermore, in other embodiments, the base may also or alternatively be moved within the formation space 46 relative to the deposition device head components 40 and 42/the deposition device head 56.

Referring to FIGS. 2A and 2B, the material consolidation device 32 is configured to (e.g., in-situ) consolidate the deposited/tacked layer of thermoplastic material 36 with the underlying thermoplastic object 48 to provide another thermoplastic object 48'; e.g., multiple consolidated layers of thermoplastic material. The material consolidation device 32, for example, may fuse (e.g., fully weld) the deposited/tacked layer of thermoplastic material (e.g., 36E) to the underlying thermoplastic object (e.g., 48). The material consolidation device 32 may also facilitate crystallization of the thermoplastic matrix in the layer with the thermoplastic matrix in the thermoplastic object 48. The material consolidation device 32 of FIGS. 2A and 2B includes a consolidation device heater 58 and a consolidation device press 60.

The consolidation device heater 58 is configured to heat a portion of the deposited/tacked layer of thermoplastic material (e.g., 36E) to or above an elevated consolidation temperature. The consolidation device heater 58 may also be configured to heat a portion of the thermoplastic object (e.g., 48) under the deposited/tacked layer of thermoplastic material (e.g., 36E) to or above the consolidation temperature. This consolidation temperature may be selected based on the specific thermoplastic matrix included in the thermoplastic material. The consolidation temperature, for example, may be selected such that the thermoplastic matrix within the thermoplastic material softens and partially melts to facilitate fusion between the thermoplastic matrix of the layer of thermoplastic material (e.g., 36E) with the thermoplastic matrix of the underlying thermoplastic object (e.g., 48). The consolidation temperature may also be at or above the crystallization temperature of the thermoplastic matrix within the thermoplastic material to induce crystallization of the thermoplastic matrix. Examples of the consolidation device heater 58 may include, but are not limited to, a laser heater, an electron beam heater, an electrical resistance (e.g., radiant) heater and a plasma or torch heater.

The consolidation device press 60 is configured to press the (e.g., heated) layer of thermoplastic material (e.g., 36E) being consolidated with the (e.g., heated) thermoplastic object (e.g., 48). The consolidation device press 60 may press the layer of thermoplastic material 36 against the thermoplastic object 48 at a consolidation pressure. This consolidation pressure may be selected to facilitate the consolidation of the layer of thermoplastic material 36 with the underlying thermoplastic object 48. The consolidation pressure may also be selected to facilitate the crystallization of the thermoplastic matrix in the layer of thermoplastic material 36 with the thermoplastic matrix in the underlying thermoplastic object 48. The consolidation device press 60 is configured to substantially follow the contour of the base exterior surface (e.g., 50). The consolidation device press 60, for example, may include a consolidation device roller 62 (e.g., see FIG. 2A) and/or a consolidation device shoe 64 (e.g., see FIG. 2B). The roller 62/the shoe 64 may each be configured to facilitate, for example, complete contact between the layer of thermoplastic material 36 and the underlying thermoplastic object 48. Here, the consolidation device press 60 is discrete from the deposition device press 42.

In some embodiments, the consolidation device heater 58 may be discrete from the consolidation device press 60. In other embodiments, the consolidation device heater 58 may be arranged with (e.g., located within and/or otherwise thermally coupled with) the consolidation device press 60; e.g., see dashed lines in FIGS. 2A and 2B. The consolidation device press 60 may thereby provide a buffer between heat generated by the consolidation device heater 58 and the thermoplastic material.

Referring to FIG. 3, the consolidation device manipulator 34 is configured to move (e.g., relocate) at least a head 66 of the material consolidation device 32 within the formation space 46. More particularly, the consolidation device manipulator 34 is configured to move the consolidation device head 66 along the thermoplastic object 48 to facilitate the consolidation of the layer of thermoplastic material 36 with the base (see FIGS. 2A and 2B). Briefly, the consolidation device head 66 may include any one or more components of the material consolidation device 32 such as, but not limited to, the consolidation device heater 58 and the consolidation device press 60. An example of the consolidation device manipulator 34 is a single-axis or multi-axis robot. Another example of the consolidation device manipulator 34 is a carriage translatable along a track. The present disclosure, however, is not limited to the foregoing exemplary consolidation device manipulators. Furthermore, in other embodiments, the base may also or alternatively be moved within the formation space 46 relative to the consolidation device head components 58 and 60/the consolidation device head 66. Here, the consolidation device manipulator 34 is discrete from the deposition device manipulator 30 which may facilitate independent movement of the consolidation device head 66 and the deposition device head 56.

Figure 4:
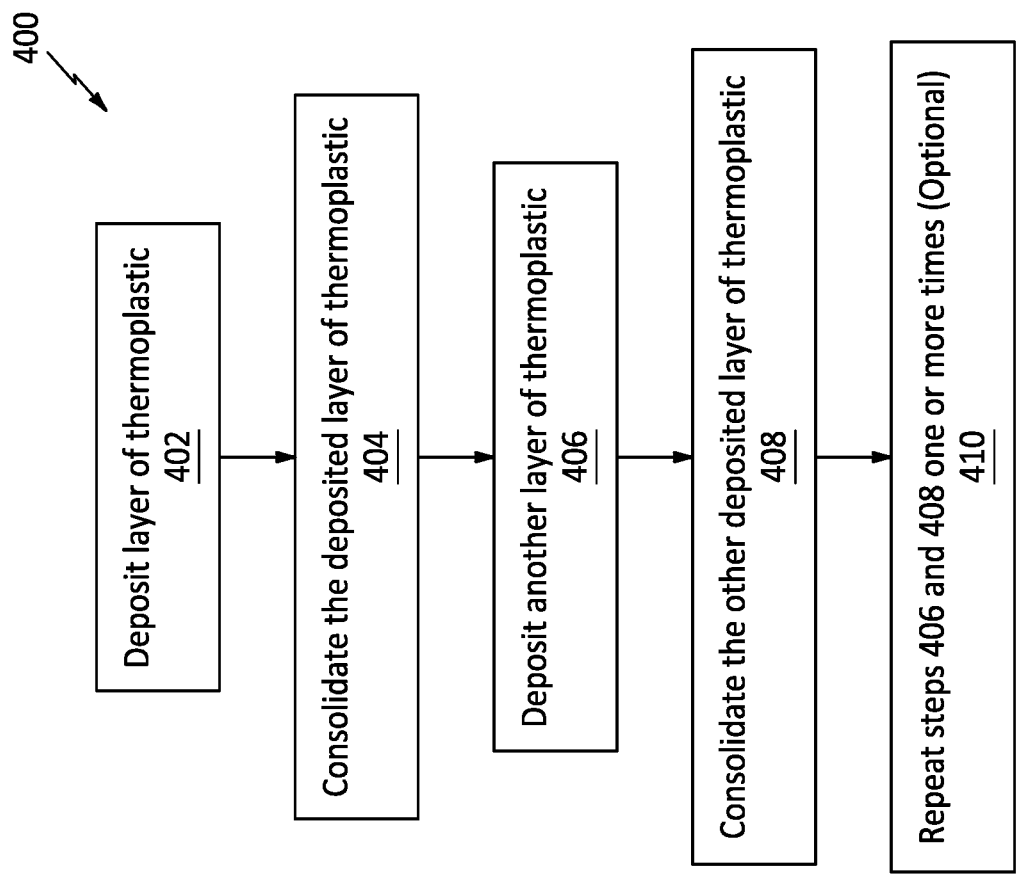
FIG. 4 is a flow diagram of a method for forming a thermoplastic structure.

FIG. 4 is a flow diagram of a method 400 for forming the thermoplastic structure 22. For ease of description, the formation method 400 is described below with reference to the formation system 20. The formation method 400 of the present disclosure, however, is not limited to using any particular type or configuration of formation system/formation system components.

In step 402, an initial layer of thermoplastic material 36A is deposited within the formation space 46. The material deposition device 28, for example, lays the initial layer of thermoplastic material 36 on the support 44. To facilitate this deposition, the deposition device manipulator 30 moves the deposition device head 56 within the formation space 46.

In step 404, the initial layer of thermoplastic material 36A is consolidated together. The material consolidation device 32, for example, heats and compresses the initial layer of the thermoplastic material 36A to consolidate the initial layer of thermoplastic material 36A together to form an initial thermoplastic object 48" (see FIGS. 2A and 2B). To facilitate this consolidation, the consolidation device manipulator 34 moves the consolidation device head 66 within the formation space 46.

In step 406, another (e.g., subsequent) layer of thermoplastic material 36B is deposited within the formation space 46. The material deposition device 28, for example, lays the layer of thermoplastic material 36B on previously deposed and consolidated layer of thermoplastic material 36A; e.g., the initial thermoplastic object 48". During this depositing, the layer of thermoplastic material 36 is tacked to the underlying thermoplastic object 48". To facilitate this deposition, the deposition device manipulator 30 moves the deposition device head 56 within the formation space 46.

In step 408, the just deposited layer of thermoplastic material 36B is consolidated together and with the previously deposited and consolidated layer (or layers) of thermoplastic material 36A; e.g., the initial thermoplastic object 48". The material consolidation device 32, for example, heats and compresses the layer of the thermoplastic material 36B to consolidate the layer of thermoplastic material 36B together and with the underlying thermoplastic object 48" to form another (e.g., subsequent) thermoplastic object. To facilitate this consolidation, the consolidation device manipulator 34 moves the consolidation device head 66 within the formation space 46.

The consolidation step 408 is performed subsequent to and/or independent of the deposition step 406. The material deposition device 28 may thereby be specifically tuned (e.g., optimized) for depositing the layer of thermoplastic material 36, and the material consolidation device 32 may be specifically tuned (e.g., optimized) for consolidating the layer of thermoplastic material 36 with the underlying thermoplastic object.

The individualized (e.g., independent) operation of the material deposition device 28 and the material consolidation device 32 may facilitate consolidating the layer of thermoplastic material 36 at a different temperature and/or a different pressure than during the depositing of the layer of thermoplastic material 36. For example, to facilitate turning (e.g., bending, redirecting, etc.) of the fibers within the thermoplastic material, the deposition temperature may be relatively low such that the thermoplastic matrix quickly hardens and the tacked layer of thermoplastic material 36 does not pull away from the underlying thermoplastic object as the deposition device manipulator 30 moves the deposition device head 56. By contrast, to facilitate (e.g., complete or further) consolidation of the layer of thermoplastic material 36 with the underlying thermoplastic object and/or crystallization, the consolidation temperature may be relatively high to increase fusion. The consolidation pressure may also be increased to ensure complete contact between the deposited/tacked layer of thermoplastic material 36 and the underlying thermoplastic object.

The individualized operation of the material deposition device 28 and the material consolidation device 32 may also or alternatively facilitate provision of different dwell times. For example, the consolidation device manipulator 34 may move the consolidation device head 66 during the consolidation step 408 at a (e.g., constant or variable) consolidation speed, whereas the deposition device manipulator 30 may move the deposition device head 56 during the deposition step 406 at a (e.g., constant or variable) deposition speed that is different (e.g., faster or slower) than the consolidation speed. Of course, the consolidation speed may alternatively be equal to the deposition speed.

Figure 5B:
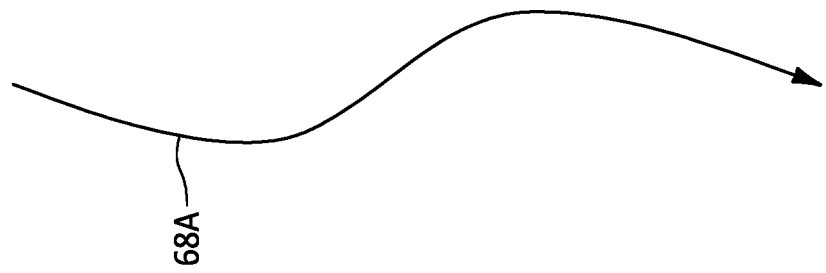
FIG. 5B is a schematic illustration of two common device paths side-by-side.
Figure 5A:
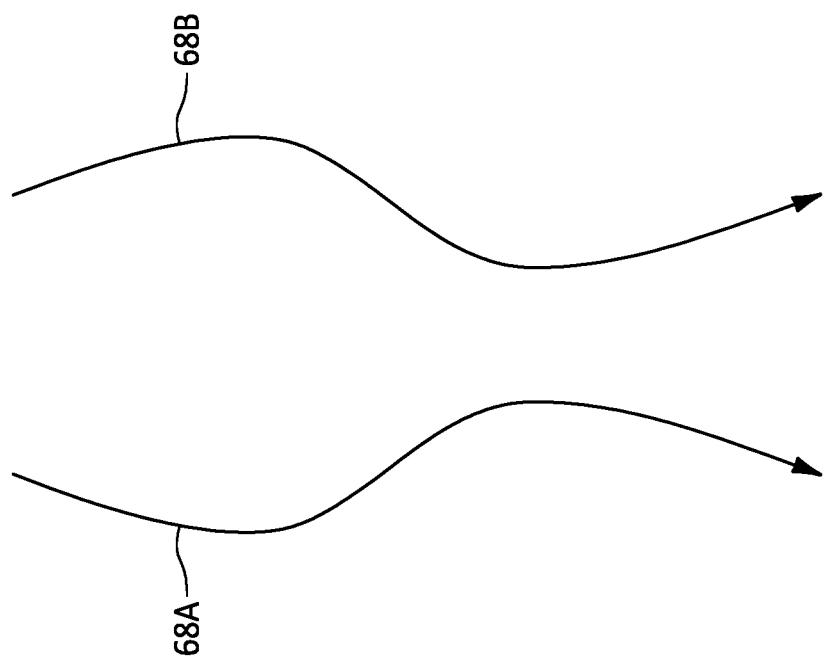
FIG. 5A is a schematic illustration of two different device paths side-by-side.

The individualizable operation of the material deposition device 28 and the material consolidation device 32 may also or alternatively facilitate movement of the deposition device head 56 and the consolidation device head 66 along different paths. For example, referring to FIG. 5A, the deposition device manipulator 30 may move the deposition device head 56 along a first path 68A during the deposition step 406. The consolidation device manipulator 34 may move the consolidation device head 66 along a second path 68B during the consolidation step 408 that is different than (e.g., crosses, is opposite to, etc.) the first path 68A; note, the paths 68A and 68B are shown side-by-side in FIG. 5A for ease of illustration. Of course, referring to FIG. 5B, the second path 68B may alternatively be the same as the first path 68A; note, the paths 68A and 68B are shown side-by-side in FIG. 5A for ease of illustration.

In step 410, the deposition step 406 and the consolidation step 408 may be repeated one or more times (as needed) to form the thermoplastic structure 22, or a preform of the thermoplastic structure 22. For example, the deposition step 406 and the consolidation step 408 may be performed to dispose and consolidate the layers 36C-E to provide the thermoplastic object 48'.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for forming a thermoplastic structure, comprising:
    depositing a first layer of thermoplastic material on a first thermoplastic object using a material deposition device comprising a deposition device press and a deposition device heater, the depositing of the first layer of thermoplastic material including
        feeding the first layer of thermoplastic material to the deposition device press, wherein the first layer of thermoplastic material fed to the deposition device press comprises a thermoplastic matrix and fiber reinforcement embedded within the thermoplastic matrix;
        heating at least a portion of the first layer of thermoplastic material to a deposition temperature using the deposition device heater; and
        tacking the first layer of thermoplastic material to the first thermoplastic object using the deposition device press, the tacking including the deposition device press following a contour of an exterior surface of the first thermoplastic object and pressing the first layer of thermoplastic material against the first thermoplastic object at a deposition pressure;
    consolidating the first layer of thermoplastic material with the first thermoplastic object using a material consolidation device comprising a consolidation device heater and a consolidation device press, to provide a second thermoplastic object, the consolidating comprising heating at least one of the first layer of the thermoplastic material or the first thermoplastic object to a consolidation temperature using the consolidation device heater, and pressing the first layer of thermoplastic material against the first thermoplastic object at a consolidation pressure to form the second thermoplastic object using the consolidation device press, wherein the consolidation device press follows the contour of the exterior surface of the first thermoplastic object and presses the first layer of thermoplastic material against the first thermoplastic object at the consolidation pressure to form the second thermoplastic object;
    depositing a second layer of thermoplastic material on the second thermoplastic object using the material deposition device, the second layer of thermoplastic material tacked to the second thermoplastic object during the depositing of the second layer of thermoplastic material; and
    consolidating the second layer of thermoplastic material with the second thermoplastic object using the material consolidation device to provide a third thermoplastic object,
    wherein the consolidation temperature is higher than the deposition temperature.

2. The method of claim 1, wherein the depositing of the first layer of thermoplastic material, the consolidating of the first layer of thermoplastic material, the depositing of the second layer of thermoplastic material and the consolidating of the second layer of thermoplastic material are performed within a common formation space.

3. The method of claim 1, wherein the material deposition device comprises an automated fiber placement device.

4. The method of claim 1, wherein the second layer of thermoplastic material comprises second fiber reinforcement within a second thermoplastic matrix.

5. The method of claim 1, wherein at least one of
    the consolidation device press comprises a consolidation device roller; or
    the deposition device press comprises a deposition device roller.

6. The method of claim 1, wherein
    the consolidation device press comprises a roller; and
    the first layer of thermoplastic material is consolidated with the first thermoplastic object using the roller.

7. The method of claim 1, wherein
    the consolidation device press comprises a shoe; and
    the first layer of thermoplastic material is consolidated with the first thermoplastic object using the shoe.

8. The method of claim 1, further comprising:
    moving a head of the material deposition device using a first manipulator; and
    moving a head of the material consolidation device using a second manipulator.

9. The method of claim 1, further comprising:
    moving a head of the material deposition device along a first path during the depositing of the first layer of thermoplastic material; and
    moving a head of the material consolidation device along a second path during the consolidating of the first layer of thermoplastic material, the second path different than the first path.

10. The method of claim 1, further comprising:
    moving a head of the material deposition device at a first speed during the depositing of the first layer of thermoplastic material; and
    moving a head of the material consolidation device at a second speed during the consolidating of the first layer of thermoplastic material, the second speed different than the first speed.

11. The method of claim 1, wherein the deposition pressure is different than the consolidation pressure.

12. The method of claim 1, further comprising:
    depositing a third layer of thermoplastic material on the third thermoplastic object using the material deposition device, the third layer of thermoplastic material tacked to the third thermoplastic object during the depositing of the third layer of thermoplastic material; and
    consolidating the third layer of thermoplastic material with the third thermoplastic object using the material consolidation device to provide a fourth thermoplastic object.

13. A method for forming a thermoplastic structure, comprising:
    depositing a first layer of thermoplastic material on a first thermoplastic object using a deposition device comprising a first press and a first heater, the depositing of the first layer of thermoplastic material including
        feeding the first layer of thermoplastic material to the first press, wherein the first layer of thermoplastic material fed to the first press comprises a thermoplastic matrix and fiber reinforcement embedded within the thermoplastic matrix;
        heating at least a portion of the first layer of thermoplastic material to a deposition temperature using the first heater; and
        tacking the first layer of thermoplastic material to the first thermoplastic object using the first press, the tacking including the first press following a contour of an exterior surface of the first thermoplastic object and pressing the first layer of thermoplastic material against the first thermoplastic object at a deposition pressure;

consolidating the first layer of thermoplastic material with the first thermoplastic object using a consolidation device to provide a second thermoplastic object, the consolidation device comprising a second heater that heats at least one of the first layer of the thermoplastic material or the first thermoplastic object to a consolidation temperature, and a second press that follows the contour of the exterior surface of the first thermoplastic object and presses the first layer of thermoplastic material against the first thermoplastic object at a consolidation pressure to form the second thermoplastic object;

depositing a second layer of thermoplastic material on the second thermoplastic object using the deposition device, the second layer of thermoplastic material tacked to the second thermoplastic object during the depositing of the second layer of thermoplastic material; and consolidating the second layer of thermoplastic material with the second thermoplastic object using the consolidation device to provide a third thermoplastic object, wherein the consolidation temperature is higher than the deposition temperature.

\* \* \* \* \*